(12) United States Patent
Eberly et al.

(10) Patent No.: US 9,963,358 B2
(45) Date of Patent: May 8, 2018

(54) OIL STOP VALVE ASSEMBLY

(71) Applicant: PARK TEQ, LLC, Houston, TX (US)

(72) Inventors: Christopher Nolan Eberly, Chappell Hill, TX (US); Saul Jimenez Rocha, Houston, TX (US)

(73) Assignee: PARK TEQ, LLC, Houston, TX (US)

( * ) Notice: Subject to any disclaimer, the term of this patent is extended or adjusted under 35 U.S.C. 154(b) by 92 days.

(21) Appl. No.: 15/097,815

(22) Filed: Apr. 13, 2016

(65) Prior Publication Data

US 2017/0297925 A1    Oct. 19, 2017

(51) Int. Cl.
| | |
|---|---|
| *B01D 17/02* | (2006.01) |
| *B01D 17/04* | (2006.01) |
| *C02F 1/40* | (2006.01) |
| *B01D 21/24* | (2006.01) |
| *C02F 101/32* | (2006.01) |

(52) U.S. Cl.
CPC ............ *C02F 1/40* (2013.01); *B01D 17/0214* (2013.01); *B01D 17/045* (2013.01); *B01D 21/2444* (2013.01); *C02F 2101/32* (2013.01); *C02F 2201/005* (2013.01); *C02F 2209/42* (2013.01); *Y10T 137/3006* (2015.04); *Y10T 137/7323* (2015.04)

(58) Field of Classification Search
CPC ............ B01D 17/0214; B01D 21/2444; B01D 17/045; C02F 1/40; C02F 2101/32; C02F 2201/005; C02F 2209/42; Y10T 137/3006; Y10T 137/3068; Y10T 137/7323; Y10T 137/053
See application file for complete search history.

(56) References Cited

U.S. PATENT DOCUMENTS

| | | | | |
|---|---|---|---|---|
| 3,722,687 A | * | 3/1973 | Stebbins ............ | B01D 17/0205 210/219 |
| 3,957,641 A | * | 5/1976 | Jakubek ............ | B01D 17/0202 210/120 |
| 4,051,030 A | * | 9/1977 | Huiet, Jr. ........... | B01D 17/0214 137/399 |
| 4,278,545 A | * | 7/1981 | Batutis ................... | B01D 17/00 210/521 |
| 5,161,564 A | * | 11/1992 | Clark ................. | B01D 17/0214 137/172 |
| 5,350,527 A | * | 9/1994 | Kitko ..................... | B01D 17/02 210/109 |
| 5,445,730 A | * | 8/1995 | Pattee ...................... | B08B 3/14 210/167.31 |
| 6,077,423 A | * | 6/2000 | Roy ....................... | B01D 29/15 210/121 |

(Continued)

*Primary Examiner* — Terry K Cecil
(74) *Attorney, Agent, or Firm* — Egbert Law Offices, PLLC

(57) ABSTRACT

An oil stop valve assembly for allowing a flow of water and blocking a flow of oil has a body having an inlet and an outlet, a seat formed adjacent to the outlet of the body, and a float positioned in the body. The float has a specific gravity of between 0.90 and 0.95 so as to be buoyant in water and to sink in oil. The float is away from the seat when a level of water within the body is above the seat. The float is seated in the seat when the level of water in the body is adjacent to the seat. The body is positioned in a container having a fluid inlet and a fluid outlet. The fluid outlet of the container is connected to the outlet of the body.

7 Claims, 5 Drawing Sheets

(56) References Cited

U.S. PATENT DOCUMENTS

| | | | | |
|---|---|---|---|---|
| 6,106,707 A * | 8/2000 | Morris | ............... | B01D 17/00 210/163 |
| 6,171,507 B1 * | 1/2001 | Roy | ............... | B01D 29/15 210/739 |
| 6,287,459 B1 * | 9/2001 | Williamson | ............... | B01D 17/00 210/164 |
| 6,315,897 B1 * | 11/2001 | Maxwell | ............... | B01D 24/12 210/170.03 |
| 6,797,161 B2 * | 9/2004 | Use | ............... | B01D 21/0012 210/131 |
| 7,258,785 B2 * | 8/2007 | Weir | ............... | E03F 1/00 210/163 |
| 7,368,054 B2 * | 5/2008 | Porter | ............... | B01D 21/0012 210/143 |
| 7,645,390 B1 * | 1/2010 | McClanahan | ............... | E03F 5/18 210/739 |
| 2001/0047958 A1 * | 12/2001 | Estep | ............... | B01D 29/15 210/433.1 |

* cited by examiner

OIL STOP VALVE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to valves for controlling the flow of a fluid. More particularly, the present invention relates to apparatus and methods whereby oil is separated from water. In particular, the present invention relates to a valve assembly which allows the flow of water while blocking the flow of oil.

2. Description of Related Art Including Information Disclosed Under 37 CFR 1.97 and 37 CFR 1.98

Water retention vaults find a wide variety of applications. These water retention vaults are often used so as to collect water from a runoff or drainage. The water retention vault is intended to serve to separate contaminants prior to passing the water back into the municipal sewage system. Various water retention vaults have been constructed having oil-separating properties, debris-separating properties, and particulate-separating properties. In particular, water retention vaults have found wide application in fields such as car washes, mechanical washing systems, helicopter an airplane washing, gasoline station cleaning, and parking lot cleaning.

In these various washing operations, such as those systems used to wash trucks, automobiles, helicopters and airplanes, a great amount of water is wasted when the wash and rinse water is not collected and cleaned for reuse. Further, in addition to water costs, without a water recycle system, additional expense is incurred in city or county water treatment and sewer system bills. When washing such vehicles, the water used in the wash collects hydrocarbons originating from petroleum distillates. Water recycle systems of the prior art have not demonstrated an adequate facility for removing these hydrocarbons from the recycled water. Additionally, in those prior art systems in which oil is effectively separated from the water, these systems tend to be very expensive, complex, and require a great deal of maintenance and repair.

Large spills of oil can also flow into storm drains, such as from loading docks, gas stations, and the like. In addition, quantities of oil and other hydrocarbons are frequently spilled on the ground and subsequent water flow, such as from rain, can cause the oil to flow into storm drains. This is often referred to as "non-point-source pollution". The volume of oil from non-point-source pollution in typical water runoff is surprisingly large. Studies of shown that if one meter of rain per year falls on a street ten meters wide, then at the observed mean rate, the annual runoff from each kilometer of street will contain about 275 liters of hydrocarbons. Other studies of non-point-source pollution have measured oil concentrations an order of magnitude higher at some locations. Spills can increase the volume of oil even more. The result of these problems include enormous annual cost, both financial and environmental, for containing and treating these waters.

Some known systems have used a screen-type filter through which the water runoff passes. However, such systems are prone to becoming clogged with debris, thereby blocking the inlet to the storm drain. Also, such systems can only collect limited amounts of oil. Other known systems use oil-absorbing materials, particularly cellulose-based materials, that can collect oil. However, those materials permit leaching of the absorbed oil back into the runoff water, because the absorbed oil is not encapsulated in the oil-absorbent material. In addition, these materials typically have small pores so as to create a blocking effect that prevents long-term effectiveness in absorbing oil and limits the quantity of water runoff the can be passed through the materials. Other known systems are available for screening of oil runoff below grade, such as in catchbasins. As such, a need has developed so as to provide a water retention system which can effectively prevent oil from passing from the tank to the sewage system or other water processing facility.

In various washing facilities, the operators are heavily fined if a significant amount of oil or other hydrocarbons passes with the water flow to the sewage system. These fines can often work disadvantageously to the profitability of such washing facilities. As such, it is important to provide a system for preventing the flow of oil outwardly of the water retention tank and into the sewer system.

In the past, various patents have issued relative to systems for capturing oil from water runoff. For example, U.S. Pat. No. 5,350,527, issued on Sep. 27, 1994 to J. C. Kitko, shows a system and process for separating impurities, such as grease, fuels and solid particulate matter from water contaminated therewith. The system comprises passing the water to be treated through a first cleanable strainer bag assembly for filtering solids, a holding/settling tank for separating an oily and water phase and for the precipitation of solids, a second cleanable strainer bag assembly having at least one strainer bag of a porosity finer than the porosity of the strainer bag of the first cleanable strainer bag assembly, a heavy oil gravity separator, a light oil coalescer, a further oil and petrochemical and very fine solid separator with a replaceable polypropylene element for adsorbing or absorbing oil and filtering solids.

U.S. Pat. No. 5,445,730, issued on Aug. 29, 1995 to H. J. Pattee, shows a grease/oil/water separator device and assembly for a vehicle water system having a tank that has three tank compartments. A settling tank is provided with entrance and exit piping such that a diagonal cross-flow of water allow sludge and debris to fall to the bottom of the settling tank. Water enters a trap tank from the settling tank. The trap tank is provided with entrance and exit piping such that a diagonal cross-flow of water is created so as to allow oil and grease to be separated from the water with the exit piping being located at the bottom of the trap tank. The water then enters a pump tank where the grease- and oil-separated water is pumped into a sand filter so as to further filter the water.

U.S. Pat. No. 6,077,423, issued on Jun. 20, 2002 to Roy et al., teaches an above-grade automatic stormwater separation filtration system. The system includes collecting the runoff in a basin and allowing the runoff to settle in the basin for a predetermined time before allowing the filtration step to be initiated. The time delay is controlled by a controller sensitive to rainfall, turbidity, or other variables selected by the user. During the filtration step, a separator member is positioned floatingly between a filter element and impurities floating on the surface of the unfiltered water.

U.S. Pat. No. 6,106,707, issued on Aug. 22, 2000 to Morris et al., describes a modular insert for a curb-inlet storm drain so as to collect trash, oil and other related chemicals. A hopper contains a multitude of irregular, macroscopic fragments of a hydrophobic, compliant, oil-absorbent, copolymer material having a high surface area. The fragments absorb and retain permanently a high quantity of oil and other chemicals passing through the hopper while permitting a high water flow-through rate. The fragments are held in place by a removable bottom plate which allows replacement of the filtering fragments. Trash and debris is collected in an internal basket.

U.S. Pat. No. 6,171,507, issued on Jan. 9, 2001 to Roy et al., provides a method and system for treating storm water runoff containing impurities. This method and system includes collecting the runoff in a basin and allowing the runoff to settle in the basin for a predetermined time before allowing the filtration step to be initiated. The time delay is controlled by a controller sensitive to rainfall, turbidity, or other variables selected by the user. During the filtration step, a separator member is positioned floatingly between a filter element and impurities floating on the surface of the unfiltered water.

U.S. Pat. No. 6,287,459, issued on Sep. 11, 2001 to J. K. Williamson, shows a drainwater treatment system for use in a vertical passageway. This drainwater treatment system includes a catch basin for accepting drainwater which flows downwardly into the drainage system and a filter-supporting section disposed alongside the catch basin. The filter-supporting section accepts drainwater which flows therein from the catch basin and permits drainwater to flow downwardly therethrough. The first and second filters contain a hydrophobic material positioned within the filter-supporting section for filtering contaminants from the drainwater flowing downwardly therethrough. An overflow is associated with the catch basin.

U.S. Pat. No. 6,315,897, issued on Nov. 13, 2001 to K. Maxwell, discloses a rainwater run-off filtering system. The system includes a tank for holding and filtering run-off water. The tank is generally cylindrical with a horizontal axis. At least one manway allows for the introduction of water and a filter media. A horizontal grate is disposed at the bottom of the tank and supports a bed of gravel and sand. Incoming water is directed onto the sand bed so as to percolate through the sand to a space below the grate. The outflow of water from the tank is regulated by a baffle plate bounding the sand bed.

U.S. Pat. No. 7,258,785, issued on Aug. 21, 2007 to Weir et al., teaches a method and apparatus for separating oil and debris from urban water run-off. The apparatus is formed of a chamber which is mounted in a storm drain system and has an inner basin with a tilted wire wedge wire screen filter which is in the path of flow of the runoff, an organic absorber floating on the water as it collects in the basin, and a discharge plate having a series of holes that are sized to regulate the flow rate of discharge of the water from the basin for removal through an outlet at the lower end of the chamber.

U.S. Pat. No. 7,368,054, issued on May 6, 2008 to Porter et al., provides an apparatus to separate oil and debris from an aqueous fluid. The separator includes a container with a cover. The top portion of the container includes a control panel access door. The separator draws an aqueous fluid with one or more skimmers that float on the aqueous fluid inside one of a plurality of corresponding reservoirs. When the separator is operating, the surface portion of the aqueous fluid is drawn into each corresponding skimmer hose and transported to the separator by a pickup hose. The separator separates oil, debris and any sludge that may be in the aqueous fluid to provide a substantially filtered aqueous fluid.

U.S. Pat. No. 7,645,390, issued on Jan. 12, 2010 to S. McClanahan, provides a storm water drainage system capable of collecting, pretreating and disposing of the storm water runoff into a dry well. It serves to stop the flow of storm water into the dry well in the event hydrocarbons or other contaminants are present in the storm water.

It is an object of the present invention to provide an oil stop valve assemble that effectively restricts the flow of oil outwardly of a containment system.

It is another object of the present invention to provide an oil stop valve assembly that is inexpensive.

It is another object of the present invention to provide an oil stop valve assembly that avoids oil discharge.

It is a further object of the present invention to provide an oil stop valve assembly which effectively separates oil from the water.

It is further object of the present invention to provide an oil stop valve assembly which avoids any siphoning effects as a result of high flows through the outlet pipe.

It is a further object of the present invention to provide an oil stop valve assembly which avoids the effects of turbulence upon the valve assembly and, as such, avoids plugging.

It is still further object of the present invention provide an oil stop valve assembly in which the float of the valve can be easily changed, replaced or repaired.

It is still further object of the present invention provide an oil stop valve assembly which provides for easy inspection and cleaning.

It is still a further object of the present invention to provide an oil stop valve assembly which is easy to use, easy to manufacture and easy to repair.

These and other objects and advantages of the present invention will become apparent from a reading of the attached specification and appended claims.

BRIEF SUMMARY OF THE INVENTION

The present invention is a valve assembly for allowing a flow of water in blocking a flow of oil. This oil stop valve assembly includes a body having an interior volume, a seat formed adjacent to the outlet of the body, and a float positioned in the body. In the preferred embodiment, the float has a specific gravity of between 0.90 and 0.95 so as to be buoyant in water and to sink in oil. The float will be away from the seat when a level of water within the body is above the seat. The float is seated in the seat when the level of water in the body is adjacent to the seat.

In the present invention, the seat is formed or affixed to a lower end of the body. A cap is removably affixed to the body at an upper end of the body opposite to the seat. The inlet of the body includes a plurality of slots formed through a wall at a lower portion of the body so as to open to an interior volume of the body in a location above the seat. In one embodiment of the present invention, the plurality of slots extend in parallel spaced relation to each other.

The float comprises a sphere. This sphere has a diameter greater than a diameter of the outlet of the body and a diameter greater than a diameter of the seat. A cord is affixed to the float and extends upwardly therefrom. This cord is adapted to lift the float upwardly from the seat.

A pipe is connected to the outlet of the body. This pipe has at least a portion extending in a direction vertically downwardly from the outlet of the body. The pipe specifically has a J-shaped configuration. The pipe has an end opposite to the outlet of the body that is as at a level higher than a level of a top of the body. An anti-siphon valve is in fluid communication with an upper portion of the pipe. The anti-siphon valve is adapted to allow air to enter an interior of the pipe and to block a flow of fluid into the upper portion of the pipe.

The present invention can further include a container having a fluid inlet and an interior volume. The body is positioned in the interior volume of the container the location away from the fluid inlet of the container. The fluid inlet of the container is adapted to pass the water and oil into the interior volume of the container. The outlet of the body is positioned adjacent to a bottom of the container. The outlet of the body is connected to a pipe. This pipe extends outwardly of the container. A coalescing plate is positioned in the internal interior volume of the container between the fluid inlet and the body. The coalescing plate is adapted to separate oil from water within the container.

DETAILED DESCRIPTION OF THE INVENTION

Figure 1:
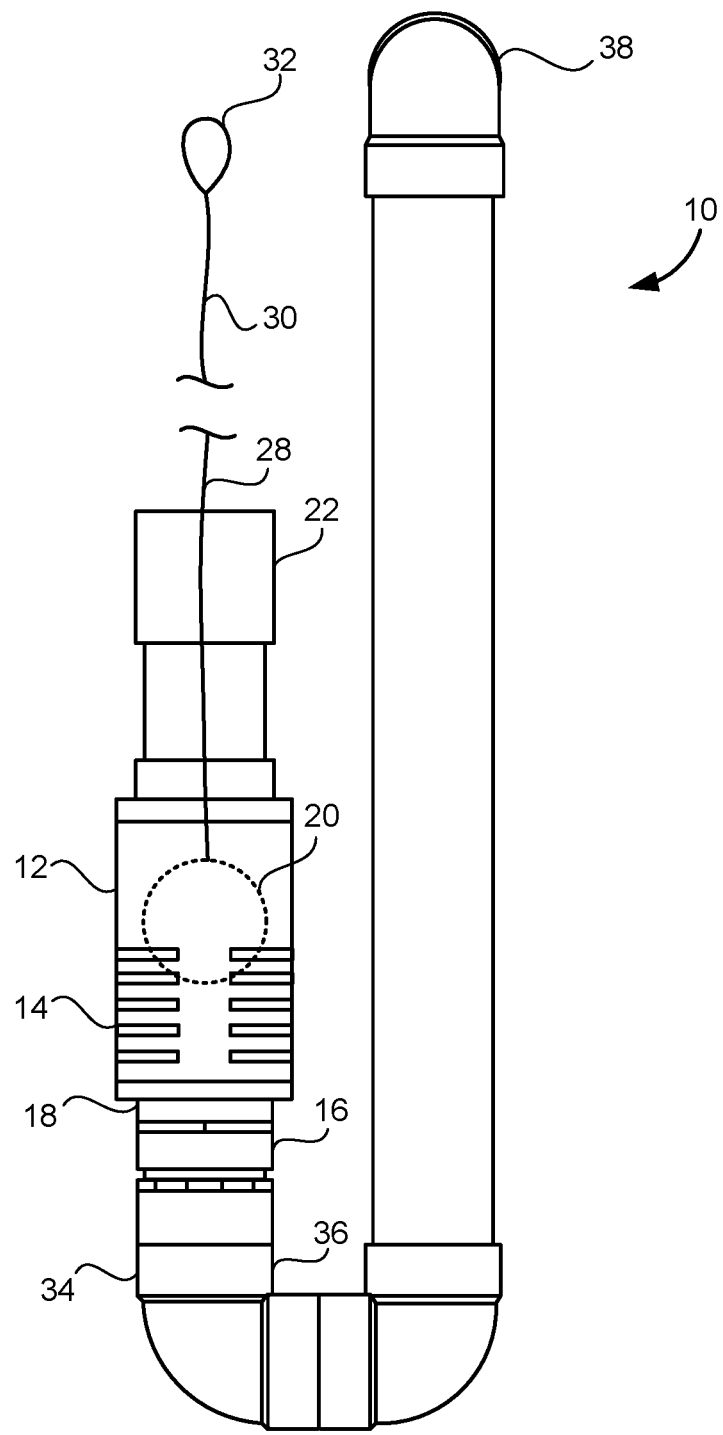
FIG. 1 is a side elevational view of the oil stop valve assembly of the present invention.

FIG. 1 shows the oil stop valve assembly 10 in accordance with the preferred embodiment of the present invention. The oil stop valve assembly 10 has a body 12 of a generally cylindrical configuration. The body 12 has an inlet 14 and an outlet 16. A seat 18 is formed generally adjacent to the outlet 16 of the body. A float 20 is positioned in the interior volume of the body 12. The float, in the preferred embodiment, has a specific gravity of between 0.90 and 0.95 so as to be buoyant in water and to sink in oil. In FIG. 1, it can be seen that the float 20 is located in a position away from the seat 18. This area would be indicative of a relatively small amount of oil within the interior volume of the body 12. As the amount of oil increases within the interior volume of the body 12, the level of water within the interior volume of body 12 will lower. The sphere 20, since it has a specific gravity greater than that of oil and less than that of water, will gradually descend toward the seat 18.

As will be described further hereinafter, as oily water flows through a coalescing plate media, oil droplets are attracted to the coalescing plates. As the oil droplets gather, they get larger until they separate from the plates and rise and fall toward the water surface so as to form an oil layer. This oil layer becomes thicker as more oil is accumulated. As the bottom of the oil layer descends down to the seat 18, the sphere 20 will descend toward the seat 18.

In normal operation, and as an example, the oil layer could be eighteen inches thick (i.e. a tank having a liquid capacity of forty-eight inches in which the top eighteen inches is oil and the bottom thirty inches is water). This is the maximum capacity of the separator. At this time, the separator should have the oil pumped out of the separator and disposed of by a service company. If the separator is not cleaned, the oil will continue to thicken beyond the eighteen inches. The oil stop valve assembly 10 of the present invention works is a safety device to stop any oil from being released. The valve activates when oil reaches a twenty-four inch thick layer, for example.

In FIG. 1, it can be seen that there is a cap 22 that is removably affixed to an upper end of the body 12 opposite the seat 18. The cap 22 has a small cord hole 28 at the upper end thereof As a result, a cord 30 can extend through the hole 28. Cord 30 is affixed, at one end, to the float 20. The cord 30 also includes a small loop 32 at the upper end thereof. The cord 30 functions so as to allow the float 20 to be lifted from a seated position and for the removal of oil from the interior volume of the body 12.

It is important to note that the float, in the preferred embodiment, has a density of between 0.90 and 0.95. However, it is possible that a different density of float could be used within the concept of the present invention. A different density of float could be used if different fluids were flowing through the separator. The float 20 can be easily changed out by removing the cap 22 and then removing or replacing the float 20. This enables the user to make this change without removing the system from operation.

The inlet 14 of the body 20 includes a plurality of slots 48 formed through the wall of the body 12 so as to open to the interior volume of the body in a location above the seat 18. It can be seen that the slots 14 extend in parallel spaced relation to each other. As such, as the level of water within the containment tank or vault increases, it will gradually flow through one of the horizontal slots 14 into the interior volume of the body 12. As such, this achieves a rather gradual flow of water into the interior volume of the body 12. The arrangement of slots 14 further facilitates the ability to separate debris from the flow of water. Importantly, it can be seen that the body 12 has no slots 14 in the upper portion of the body 12. Under normal conditions (in which there is a substantial amount of water within the body 12), water enters the slots 14 and down through the seat 18. As the flow rate of fluid increases, there exist, a potential for the float 20 to be pushed down by turbulence of the water. This could cause an intermittent plugging of the seat 18 and result in inefficient operation. In order to prevent this potential problem caused by water turbulence, the slots 14 are positioned in the lower portion of the body 12 so that there remains at an upper portion of the body 12 that protects the float 20 from this turbulence. The only area of the float 20 that is exposed to turbulent water would be the lower bottom surface of the float 20.

The seat 18 is configured so as to conform to the outer diameter of the float 20. In one embodiment, the seat 18 can be of a complementary spheroid shape or semi-spheroid shape such that the spherical float 20 can properly nest within the seat. In other circumstances, the seat 18 can simply be the top end of the outlet 16. As such, the round outer surface of the float 12 can simply nest against the end of the round pipe which forms the outlet 18. The only requirement is that when the float 20 resides against the seat 18, it effectively blocks fluid flow through the outlet 18.

A pipe 34 is connected to the outlet 16 of the body 12. The pipe 34 includes a portion 36 that extends vertically downwardly from the outlet 16. The pipe 34 has a generally J-shaped configuration. The pipe 34 has an end 38 opposite the outlet 16 that is at a level higher than a level of the top of the body 12. As such, the outflow of water from the body 12 and from the containment vault to which it is received will flow upwardly and outwardly of the container at a higher level than which it is introduced into the body 12. As will be described hereinafter, an anti-siphon valve can be connected to an upper portion of pipe 34.

Figure 2:
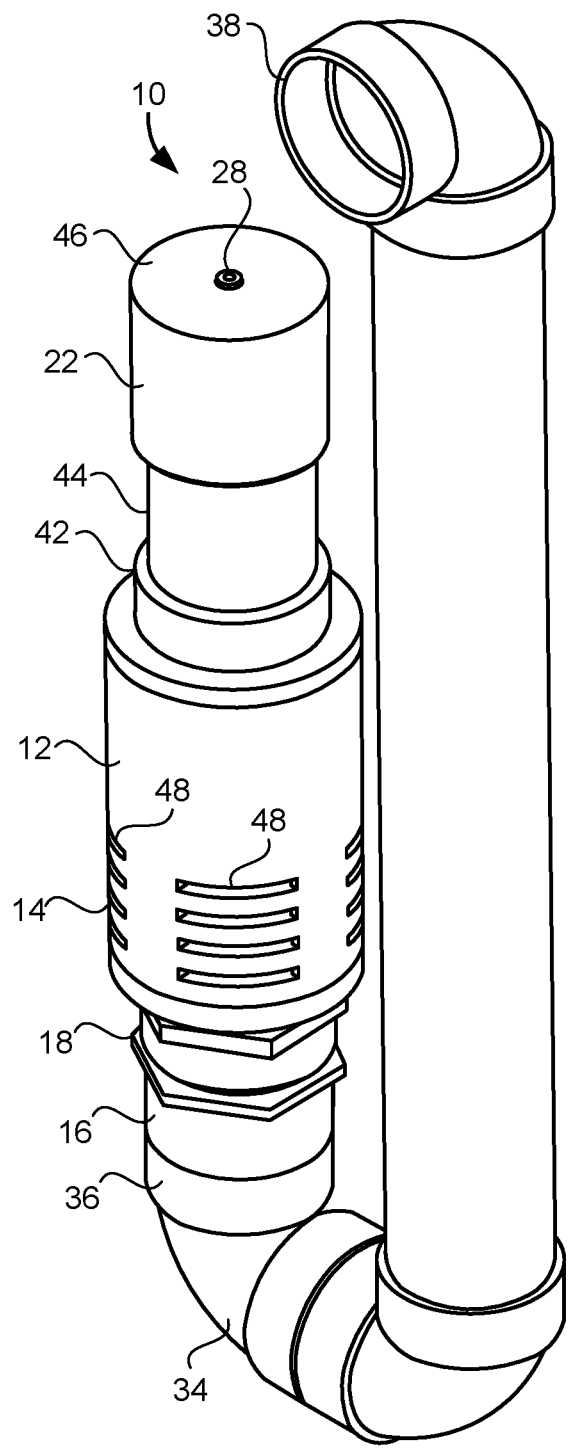
FIG. 2 is an upper perspective view of the oil stop valve assembly of the present invention.

FIG. 2 illustrates the oil stop valve assembly 10 of the present invention. As can be seen, the body 12 has a generally cylindrical shape. The body 12 includes a neck 42 at the upper end thereof. A tubular member 44 extends upwardly from neck 42. The cap 22 can be threadedly received, or otherwise affixed, onto the tubular member 44. The cap 22 includes hole 28 which allows the cord 30 to pass therethrough. Hole 28 is centrally located on the top surface 46 of the cap 22.

The body 12 includes the fluid inlet 14 that comprises a plurality of slots that are arranged in generally parallel relationship to each other. In particular, the slots at one level along with a body 12 will be in spaced end-to-end relationship to each other. As such, this arrangement of slots 48 of inlet 14 allows the entry of fluid and oil from all directions around the body 12.

The seat 18 is generally illustrated as located at the bottom of body 12 and above the outlet 16. As stated hereinbefore, the seat 18 can be integral with the outlet 16 or can be a separate component. The portion 36 of pipe 34 is affixed to the bottom end of the outlet 16. The opposite end 38 of pipe 34 is illustrated as opening to the interior of the pipe 34. Ultimately, the end 38 can be attached to further piping such that the discharge of water from the oil stop valve assembly 10 can pass outwardly of the containment vessel to the sewage system or for further treatment and reuse. The oil stop valve assembly 10 of the present invention provides in-situ cleaning without having to remove the valve or removing the system from operation. By opening the cap 22, the user can inspect and clean the float 20, the interior body 12, the seat 18, and the pipes 34 and 36. This cleaning can be carried up through the use of a pressure washer. The oil stop valve assembly 10 of the present invention can be removed and/or installed without entering the container of the separator. Since the container can be considered as a "confined space" as defined by OSHA, it could be hazardous to the user. The outlet 16 is unscrewed from the pipe 36 and then removed for cleaning or replacement. This activity can be performed from the top of the container via the hatchway.

Figure 3:
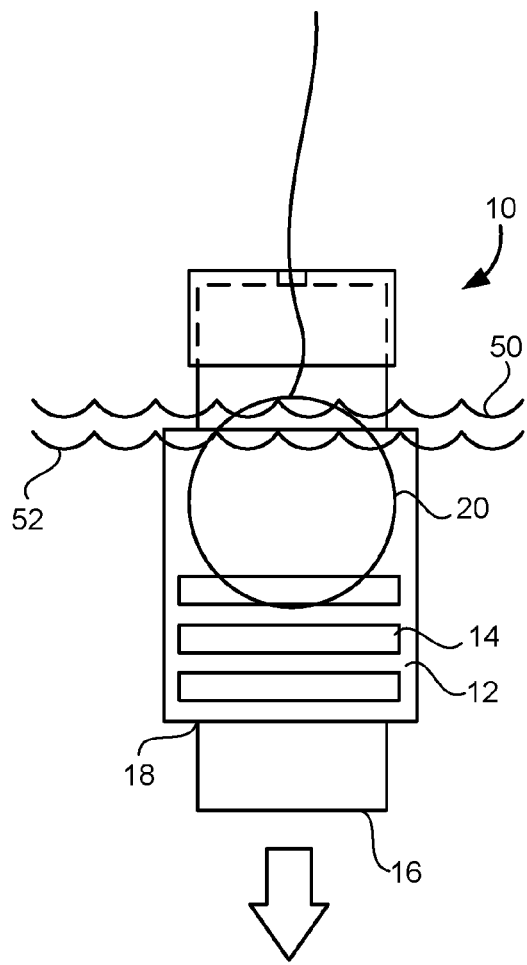
FIG. 3 is a cross-sectional view showing the position of the float of the oil stop valve assembly of the present invention in an elevated position.

FIG. 3 illustrates the operation of the oil stop valve assembly 10 of the present invention. In FIG. 3, there is a oil level 50 and a water level 52. In FIG. 3, the oil level 50 is relatively minimal and will reside on the top of the water level 52. The float 20 is illustrated as floating on the water 52 a significant distance above the seat 18. As such, the more dense water can flow downwardly through the outlet 16. The oil within the water flow through the inlet 14 will ultimately rise because the oil has a lesser specific gravity than water. As such, it will form an oil layer 50 on the top of the water 52.

Since the float 20 has a specific gravity of between 0.90 and 0.95, it is less than the specific gravity of water (1.00) and greater than the specific gravity of oil (0.90). As such, the water 52 will cause the float 22 to achieve this elevated position within the body 12 and away from the seat 18.

Figure 4:
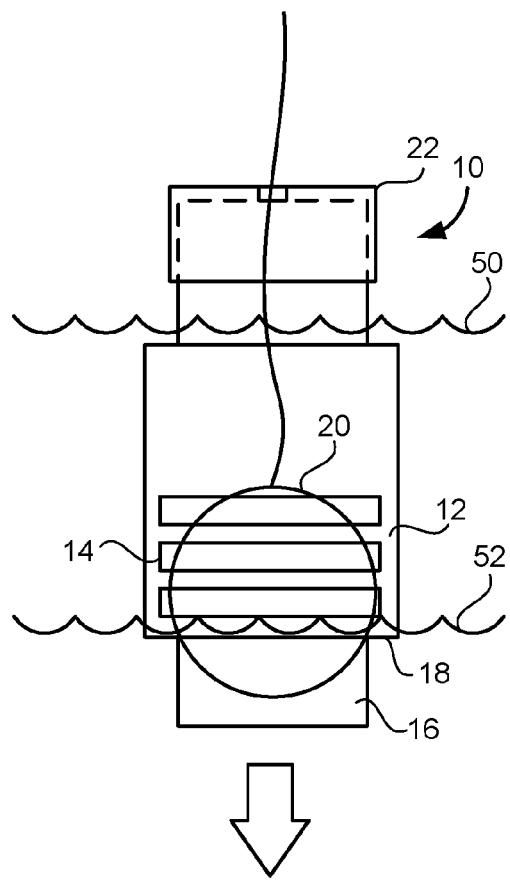
FIG. 4 shows the float of the oil stop valve assembly of the present invention in a seated position.

FIG. 4 illustrates the oil stop valve assembly 10 of the present invention when the amount of oil 50 within the body 12 is very great. As can be seen, the level of water 52 will be adjacent to the seat 18. Ultimately, in the process of the oil stop valve assembly 10 of the present invention, the introduction of oil-containing water into the body 12 will ultimately cause the level of water 52 to lower within the body 12. Since the float 20 sinks in the oil 50 and floats on the water 52, it will descend within the body 12 until the float 20 ultimately seats itself within the seat 18. As such, further flow of water and oil outwardly through the outlet 16 of the body is prevented.

Within the concept of the present invention, it is easily possible to integrate alarms, sensors, and other devices so as to detect when the flow of water through the outlet 16 has ceased. At this time, the operator can be notified that excess oil remains within the separator (as shown hereinafter). The oil stop valve assembly 10 of the present invention is used as a "failsafe" to prevent oil from discharging out of the container of the separator. When the oil layer accumulates and descends down towards the seat 18, the valve of the oil stop valve assembly 10 will close. Importantly, the preferred operation of the separator system would be that the oil is removed from the container of the separator before this valve would close in the oil stop valve assembly. Any trace of oil left in the body 12 can be flushed outwardly via refilling of the container with water (after all the fluids are removed from the container). This trace oil will rise, due to gravity, up toward the cap 22 and then pass through the cord hole 28. The cap 22 will not be removed unless (on rare occasions) the float needs to be inspected or repaired. The oil is automatically removed from the interior of the body 12 via the cord hole 28 when the separator is recharged with water. The cord 30 can then be used so as to lift the float 20 from its seated position so that the operation of the present invention can be reinstated and proceed unaffected by the sealing of the float 20.

Figure 5:
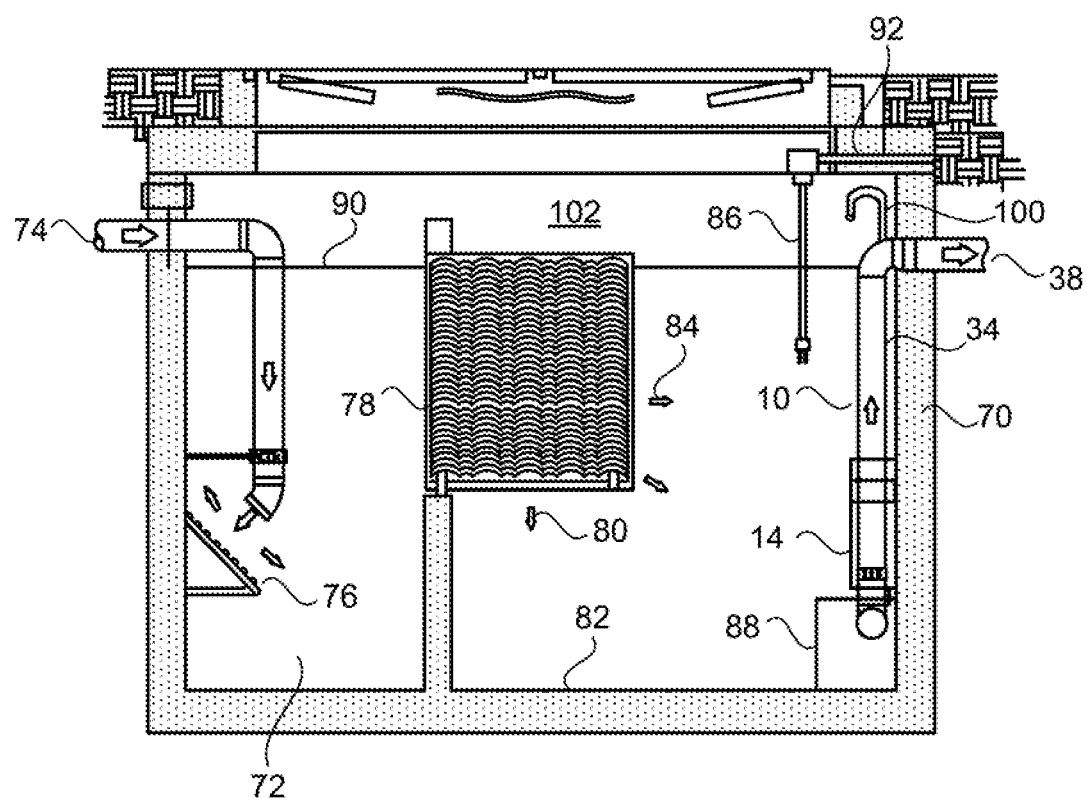
FIG. 5 is a cross-sectional view showing the installation of the oil stop valve assembly of the present invention in a water retention container.

FIG. 5 shows the installation of the oil stop valve assembly 10 within a container 70. Container 70 can be in the nature of a containment vault or water retention vault. Ultimately, water from a surface location is fed into the interior volume 72 of the container 70 through the inlet 74. Presumably, the water that flows through the inlet 74 will contain water with a small amount of oil mixed therein. The inlet 74 is of an elbow shape such that the inlet 74 can discharge the oil-containing water in a direction toward a diffusion baffle 76. Ultimately, the flow of water of the oil-containing water will pass toward a coalescing plate 78 located within the interior volume 72 of the container 70. As oily water flows through the coalescing plate 18, the oil droplets are attracted to the coalescing plates 78. As the oil droplets gather, they get larger until they separate from the plates and rise toward the water surface so as to form an oil layer. This oil layer becomes thicker as more oil is accumulated. The water will then flow in the direction of arrows 84 outwardly and toward the opposite side of the container 70 from the inlet 74. The water from the flow 84 will pass into the inlet 14 of the oil stop valve 10. The oil stop valve 10 will then operate in the manner described hereinbefore such that oil-free water flows outwardly of the pipe through the outlet 38 of the pipe 34. It can be seen that the outlet 38 of the pipe 34 will extend outwardly of the container 70.

As the bottom of the oil layer within the container descends downwardly toward the seat 18, the sphere 20 will descend toward the seat 18. As an example, under certain circumstances, during normal operation, the oil layer could be eighteen inches thick. The container 70 would have a liquid capacity of forty-eight inches in height. As such, the top eighteen inches would be oil and the bottom thirty inches would be water. This is the maximum capacity of the separator. Under normal circumstances, when the oil layer is eighteen inches thick, the oil should be pumped out and disposed of by a service company. If the separator is not cleaned, the oil will continue to thicken beyond this eighteen inch limit. The oil stop valve assembly 10 will operate as a safety device to stop any oil from being released. The valve will activate when the oil reaches a twenty-six inch thick layer. At this time, the excess oil accumulation can then be remedied so that the process can begin again. As such, the present invention is directed to those circumstances where the container 70 is not continually cleaned. There would be very little turbulence that would otherwise upset the positioning of the float 20 and the operation of the oil stop valve.

FIG. 5 shows that there is an anti-siphon valve 100 that is affixed to the pipe 34 so as to be in fluid communication therewith. The anti-siphon valve 100 has an end that opens to an air space 102 within the container 70. Under normal circumstances, the open end of the anti-siphon valve 100 will be located above the level of the oil layer within the container 70.

As water exits the container 70 via the pipe 34, especially in circumstances of extremely high flow rates (i.e. a full pipe), it could have a tendency to create a siphon effect. If this siphon occurs, it could cause the container 70 to empty itself of all water, including the oil layer. This could be detrimental and cause unwanted oil to be released through the pipe 38 into the sewer. In order to prevent this effect, the anti-siphon valve 100 is placed at the top of the pipe 34.

A high oil float switch 86 extends into the interior 72 of the container 70. Ultimately, if oil should reach the level of this high oil float switch 86, the entire system will be shut down so that no further flow through the fluid inlet can occur. A sludge baffle 88 is positioned around the bottom of the oil stop valve 10.

In FIG. 5, it can be seen that the liquid level 90 is slightly spaced away from the bottom of the top 92 of the container 70. This level of liquid 90 is slightly below the level of the outlet 38 of the pipe 34. As a result, hydrostatic pressure will continue to urge the fluid flow along the directions described hereinbefore.

Figure 6:
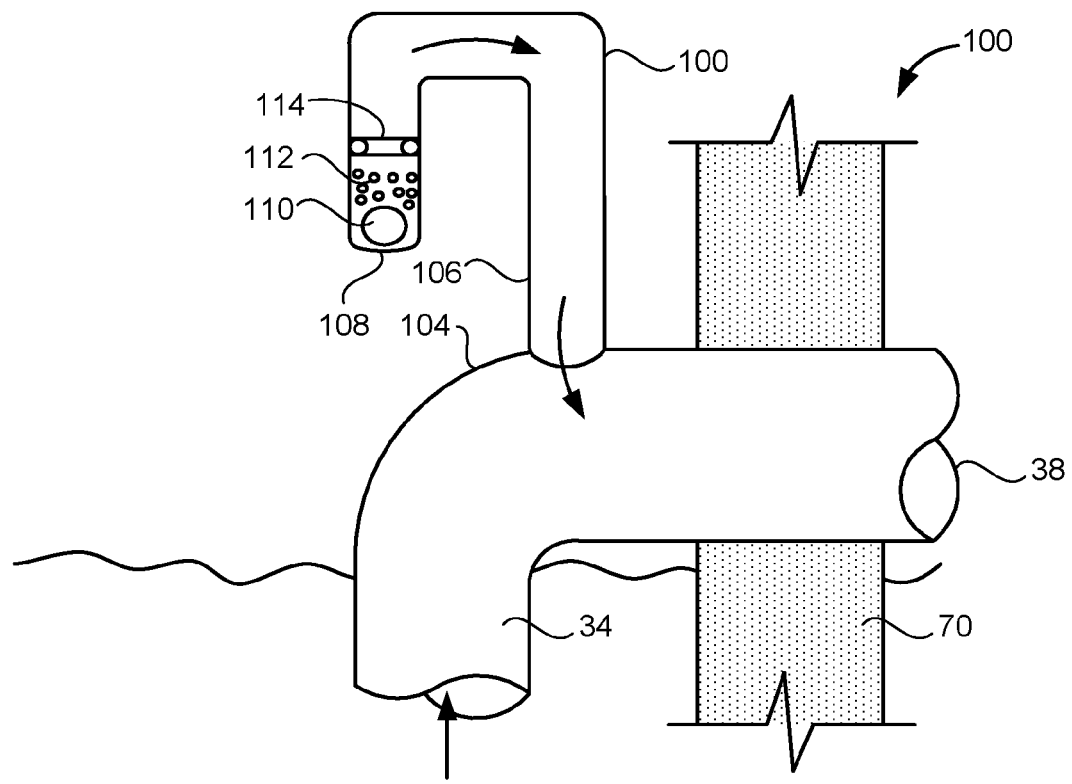
FIG. 6 is a side cross-sectional view of the anti-siphon valve as connected to the oil, stop valve assembly.

FIG. 6 particularly illustrates the structure of this anti-siphon valve 100. It can be seen that the pipe 34 has an upper portion 104 which extends toward the outlet 38. The pipe 34 is of an inverted J-shaped configuration so that the outlet 38 extends through the wall of container 70. The anti-siphon valve 100 is also an inverted J-shaped pipe 106 that has an end 108. A sphere 110 will reside adjacent to the end 108 under normal circumstances. A plurality of openings 112 is provided adjacent to the end 108 so as to allow fluids (including air from air space 102) to enter the interior of the pipe 100. A seat 114 is provided in a location that above the end 108.

During normal operation of the separator system, water flows with low to moderate flows through the system in the manner previously described. As the flow rate reaches a high flow rate, a filling of the pipe 34 can occur. As result, the potential exists that a siphon condition can occur. When a negative air pressure occurs, air is allowed to enter through the openings 112 of the siphon inlet. This will provide for air pressure equalization.

It is important to note that an anti-siphon valve of a normal configuration could present another potential issue. This concerns the release of oil through the pipe 34 at as a result of the raising of the oil layer at the top of the water. To prevent this, the ball valve, including sphere 110 and seat 114, is used. During high flow rates, there would exist a potential for the liquid level to rise in the container 70. If the liquid level reaches the inlets 112 and the seal 114 of the anti-siphon valve 100, the sphere 110 will rise to the level of the seal 114. This will effectively seal against any liquid from exiting the container 70. The sphere 110 will have a density of less than 0.70 so as to allow the sphere 110 to float on oil or water.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A valve assembly for allowing a flow of water and blocking the flow of oil, the valve assembly comprising:
   a body having an interior volume, said body having an inlet and an outlet;
   a seat formed adjacent said outlet of said body;
   a float positioned in said body, said float having a specific gravity of between 0.90 and 0.95 so as to be buoyant in water and to sink in oil, said float being away from said seat when a level of water within said body is above said seat, said float being seated in said seat when the level of water in said body is adjacent said seat;
   a container having a fluid inlet and an interior volume, said body positioned in said interior volume of said container in a location away from said fluid inlet of said container, said fluid inlet of said container adapted to pass the water and oil into said interior volume of said container, said outlet of said body connected to a pipe, said pipe extending outwardly of said container; and
   an anti-siphon valve affixed to an upper portion of said pipe so as to be in fluid communication therewith, said anti-siphon valve having an end opposite said pipe that is positioned within said interior volume of said container, said anti-siphon valve comprising:
      an inverted J-shaped pipe having a fluid inlet at or adjacent to the end opposite said pipe;
      a seat affixed or formed in said inverted J-shaped pipe in a location above said fluid inlet of said J-shaped pipe; and
      a sphere located within said J-shaped pipe adjacent the fluid inlet thereof, said sphere movable between a position juxtaposed against said seat and a position below said seat.

2. The valve assembly of claim 1, further comprising:
   a coalescing plate positioned in said internal volume of said container between said fluid inlet and said body, said coalescing plate adapted to separate oil from water within said container.

3. A water processing system comprising:
   a container having an interior and a bottom and a fluid inlet and a fluid outlet;

a body having an interior volume, said body having an inlet and an outlet, said body positioned adjacent to said fluid outlet of said container, said outlet of said body connected to one end of a pipe, said pipe extending outwardly of said container, said inlet of said body comprising a plurality of horizontal slots formed through a wall only at a lower portion of said body and not at an upper portion of said body, said plurality of horizontal slots opening to said interior volume of said body;

a seat formed adjacent to said outlet of said body;

a float positioned in said body, said float having a specific gravity that sinks in oil, said float being away from said seat when a level of water within said body is above said seat, said float being seated in said body when the level of water in said body is adjacent said seat, said outlet of said body connected to said fluid outlet of said container; and an anti-siphon valve affixed adjacent to said opposite end of said pipe within said container, said anti-siphon valve being in fluid communication with said pipe, said anti-siphon valve having an end opposite said pipe that is positioned in an upper portion of said container, said anti-siphon valve comprising:

an inverted J-shaped pipe having a fluid inlet at or adjacent to the end opposite said pipe;

a seat affixed or formed in said inverted J-shaped pipe in a location above said fluid inlet of said J-shaped pipe; and a sphere located within said J-shaped pipe adjacent the fluid inlet thereof, said sphere movable between a position juxtaposed against said seat and a position below said seat.

4. The water processing system of claim 3, said seat formed adjacent said body outlet being formed or affixed to a lower end of said body.

5. The water processing system of claim 3, said body positioned in said interior of said container in a location away from said fluid inlet of said container, said outlet of said body positioned adjacent to said bottom of said container.

6. The water processing system of claim 3, said pipe having an opposite end that is at a level higher than a level of a top of said body.

7. The water processing system of claim 3, further comprising:

a coalescing plate positioned in said interior volume of said container between said fluid inlet and said body, said coalescing plate adapted to separate oil from water within said container.

* * * * *